United States Patent Office.

JULIUS JACOB CZEPULL, OF LANCASTER, PENNSYLVANIA.

BUILDING MATERIAL AND PROCESS OF MAKING SAME.

SPECIFICATION forming part of Letters Patent No. 581,478, dated April 27, 1897.

Application filed March 24, 1896. Serial No. 584,656. (No specimens.)

*To all whom it may concern:*

Be it known that I, JULIUS JACOB CZEPULL, a subject of the King of Prussia, Emperor of Germany, residing in Lancaster, in the county of Lancaster, State of Pennsylvania, have invented certain Improvements in Bricks and in the Process of Manufacturing the Same, of which the following is a specification.

This invention relates to improvements in bricks or other masses of building material formed from a compound and to improvements in the process of manufacturing the same; and the object of my improvements is to produce good bricks at less cost than the ordinary burnt-clay bricks and to utilize at the same time material which is otherwise practically valueless.

These bricks are formed of a composition consisting of the following ingredients, combined in about the proportions stated, viz: furnace-slag, broken or pulverized, twenty-five parts; slaked lime, twenty-four parts; unslaked lime, one part.

The slag is run directly from the furnace into water to be granulated, and upon being removed from the water it is, for the finer grade of bricks, put through a crusher. The crushed slag and the unslaked lime are then mixed dry. The slaked lime is separately mixed with water, after which all the ingredients are thoroughly commingled. The slaked lime should have sufficient water mixed therewith to form a fluid mass. When all the ingredients are commingled, the mass should be of just such consistency as will permit it to be filled into the molds. After being placed in the molds the mixture therein is subjected to heavy pressure, and after being thoroughly compressed the masses are removed from the molds and dried by exposure to the air from three to four weeks. The longer they are exposed to the air the harder the masses become.

The foregoing applies to bricks of the finer quality. For ordinary bricks it is not necessary to pass the slag through a crusher, as it can be used in the granulated state in which it comes from the water.

The manner of mixing is in each case the same, and for each grade of bricks the composition is compressed under great pressure in molds and then removed from the molds and dried in the air, the action of the air in each case setting the compound.

After the ingredients are mixed the slaking of the unslaked lime begins, and it continues in the mass until the process is finished, completely binding and setting all the parts together into a hard solid homogeneous body. As soon as the mixing is completed I begin filling the molds and compressing the compound therein, so that the slaking of the unslaked lime may be continued in the amalgamated mass and during and after the compression of the same.

It is not essential that the slag should be run into water, for masses of the same may be taken from the bank where it has been dumped in the usual manner and be broken and crushed to a sufficient degree of fineness, but the cheapest and most expeditious manner of preparing the slag for use is to run the same directly from the furnace into water, as has been explained.

Bricks thus made of my compound are much cheaper than any clay bricks and are more compact and harder than the same.

I do not restrict myself to the exact proportions herein specified, as the proportions may be varied to produce bricks of different qualities; neither do I confine myself to the special manner of mixing herein described, for, if preferable, any one of the ingredients may first be mixed with any one of the other ingredients and the remaining ingredients then be added, but I prefer the mode of mixing described.

Having thus described my invention, what I claim as new, and desire to secure by Letters Patent, is—

1. A compound for making bricks, consisting of slag, slaked lime, and unslaked lime, in about the proportions stated, substantially as set forth.

2. The within-described process of making bricks, the same consisting in commingling granulated or comminuted slag, slaked lime, unslaked lime, and water, compacting this composition under pressure to form bricks, and then air-drying the bricks, substantially as specified.

3. The within-described process of making bricks, the same consisting in commingling granulated or comminuted slag, slaked lime, unslaked lime, and water, compacting the same under pressure to form bricks while the slaking of the unslaked lime is still in progress, and then air-drying the bricks, substantially as specified.

JULIUS JACOB CZEPULL.

Witnesses:
C. G. BASSLER,
WM. R. GERHART.